United States Patent
Wiest et al.

(10) Patent No.: US 11,507,392 B2
(45) Date of Patent: Nov. 22, 2022

(54) AUTOMATICALLY CONFIGURING COMPUTING CLUSTERS

(71) Applicant: Red Hat, Inc., Raleigh, NC (US)

(72) Inventors: Thomas Wiest, Sanford, NC (US); Andrew Butcher, Raleigh, NC (US); Cesar Wong, Cary, NC (US); Joel Diaz, Cary, NC (US)

(73) Assignee: RED HAT, INC., Raleigh, NC (US)

( * ) Notice: Subject to any disclaimer, the term of this patent is extended or adjusted under 35 U.S.C. 154(b) by 277 days.

(21) Appl. No.: 16/801,303

(22) Filed: Feb. 26, 2020

(65) Prior Publication Data

US 2021/0263751 A1    Aug. 26, 2021

(51) Int. Cl.
| | |
|---|---|
| *G06F 9/445* | (2018.01) |
| *G06F 9/38* | (2018.01) |
| *G06F 11/30* | (2006.01) |
| *G06F 9/54* | (2006.01) |
| *G06F 9/48* | (2006.01) |

(52) U.S. Cl.
CPC ........ *G06F 9/44505* (2013.01); *G06F 9/3891* (2013.01); *G06F 9/485* (2013.01); *G06F 9/54* (2013.01); *G06F 11/3006* (2013.01); *G06F 11/3051* (2013.01)

(58) Field of Classification Search
CPC .... G06F 9/44505; G06F 9/3891; G06F 9/485; G06F 9/54; G06F 11/3006; G06F 11/3051
USPC ....................................................... 713/100
See application file for complete search history.

(56) References Cited

U.S. PATENT DOCUMENTS

| | | | |
|---|---|---|---|
| 6,173,420 B1* | 1/2001 | Sunkara | G06F 11/1415 714/38.14 |
| 6,185,601 B1* | 2/2001 | Wolff | G06F 16/10 709/203 |
| 7,409,685 B2* | 8/2008 | Chen | G06F 8/65 713/1 |
| 7,603,445 B1* | 10/2009 | Fehrle | H04L 41/28 370/254 |
| 9,594,601 B2 | 3/2017 | Shau et al. | |
| 10,394,550 B2 | 8/2019 | Islam et al. | |
| 10,423,876 B2* | 9/2019 | Henry | G06F 12/08 |
| 10,545,866 B1* | 1/2020 | Kato | G11C 29/028 |

(Continued)

FOREIGN PATENT DOCUMENTS

| | | |
|---|---|---|
| KR | 101987664 B1 | 6/2019 |
| KR | 101998564 B1 | 7/2019 |

OTHER PUBLICATIONS

"Configuring Only a Subset of Clusters," Google Cloud, https://cloud.google.com/anthos-config-management/docs/how-to/clusterselectors.

(Continued)

*Primary Examiner* — Paul R. Myers
(74) *Attorney, Agent, or Firm* — Kilpatrick Townsend & Stockton LLP

(57) ABSTRACT

Computing clusters can be automatically configured according to some aspects described herein. For example, a system can receive configuration datasets from instantiated objects in a management cluster. The configuration datasets can be for configuring target objects in managed clusters, where the managed clusters are separate from the management cluster. The system can then configure the target objects within each of the managed clusters based on the configuration datasets.

20 Claims, 4 Drawing Sheets

(56) References Cited

U.S. PATENT DOCUMENTS

| | | | | |
|---|---|---|---|---|
| 2002/0075870 | A1* | 6/2002 | de Azevedo | H04L 69/329 370/390 |
| 2003/0191739 | A1* | 10/2003 | Chatterjee | G06F 16/252 |
| 2004/0177135 | A1* | 9/2004 | Monaton | G06F 8/61 709/222 |
| 2004/0243673 | A1* | 12/2004 | Goyal | H04L 41/0853 709/204 |
| 2005/0256948 | A1* | 11/2005 | Hu | G06F 11/3672 714/E11.207 |
| 2006/0136928 | A1* | 6/2006 | Crawford, Jr. | G06F 9/5083 718/105 |
| 2007/0191109 | A1* | 8/2007 | Crowder | G07F 17/32 463/42 |
| 2011/0185047 | A1* | 7/2011 | Vaidyanathan | H04L 41/0856 709/220 |
| 2012/0131126 | A1* | 5/2012 | Bandyopadhyay | G06F 11/2097 709/213 |
| 2013/0191436 | A1* | 7/2013 | Chintalapati | G06F 9/5072 709/224 |
| 2014/0047342 | A1* | 2/2014 | Breternitz | G06F 9/5061 715/735 |
| 2014/0281472 | A1* | 9/2014 | Yalamanchili | G06F 15/7871 713/100 |
| 2016/0050261 | A1* | 2/2016 | McDaid | H04L 45/302 709/204 |
| 2016/0077881 | A1* | 3/2016 | Anderson | G06F 9/5011 718/104 |
| 2017/0262346 | A1* | 9/2017 | Pradhan | G06F 11/2074 |
| 2017/0317974 | A1* | 11/2017 | Masurekar | H04L 67/2804 |
| 2018/0203499 | A1* | 7/2018 | Huang | G06F 11/2015 |
| 2019/0012211 | A1* | 1/2019 | Selvaraj | G06F 3/06 |
| 2019/0095263 | A1* | 3/2019 | Lahav | G06F 11/3006 |
| 2021/0157694 | A1* | 5/2021 | Dye | G06F 11/2023 |

OTHER PUBLICATIONS

"Using RBAC Authorization," The Kubernetes Authors, Oct. 23, 2019, https://kubernetes.io/docs/reference/access-authn-authz/rbac/.

"SyncSet," GitHub, Inc., 2020, https://github.com/openshift/hive/blob/v1/docs/syncset.md.

"OpenShift Hive Architecture," Github, Inc., 2020, https://github.com/openshift/hive/blob/v1/docs/architecture.md.

"Anthos Config Management," Google Cloud, 2020, https://cloud.google.com/anthos/config-management/.

"How-to Guides, Installing and managing Anthos Config Management," Google Cloud, 2020, https://cloud.google.com/anthos-config-management/docs/how-to.

* cited by examiner

200

```
apiVersion: hive.openshift.io/v1
kind: SyncSet
metadata:
  name: mygroup
spec:
  clusterDeploymentRefs:
  - name: ClusterName
```
⎬ 202 objectApplyMode: Upsert ⎬ 204

```
objects:
- apiVersion: user.openshift.io/v1
  kind: Group
  metadata:
    name: mygroup
  users:
  - myuser
```
⎬ 206

```
patches:
- kind: ConfigMap
  apiVersion: v1
  name: foo
  namespace: default
  patch: |-
    { "data": { "foo": "new-bar" } }
  patchMode: merge
```
⎬ 208

```
sensitiveInformation:
- source:
    name: ad-bind-password
    namespace: default
  target:
    name: ad-bind-password
    namespace: openshift-config
```
⎬ 210

FIG. 2

AUTOMATICALLY CONFIGURING COMPUTING CLUSTERS

TECHNICAL FIELD

The present disclosure relates generally to configuring computing clusters. More specifically, but not by way of limitation, this disclosure relates to automatically configuring computing clusters.

BACKGROUND

There are various types of distributed computing systems, such as grid computing systems, computing clusters, and cloud computing systems. Among these, computing clusters and cloud computing systems have become increasingly popular.

A computing cluster (cluster) is a group of nodes that can work together like a single system to combine computing power. Each node in the cluster may be running the same operating system and have other commonalities. A cluster can assign the same computing task to every node, or can assign different computing tasks to different nodes.

Cloud computing systems have a shared pool of computing resources (e.g., servers, storage, and virtual machines) that are used to provide services to developers on demand. These services are generally provided according to a variety of service models, such as Infrastructure as a Service (Iaas), Platform as a Service (PaaS), or Software as a Service (SaaS). But regardless of the service model, cloud providers manage the physical infrastructures of the cloud computing systems to relieve this burden from developers, so that the developers can focus on deploying applications.

BRIEF DESCRIPTION OF THE DRAWINGS

FIG. 2 is an example of a configuration dataset according to some aspects of the present disclosure.

DETAILED DESCRIPTION

Figure 1:
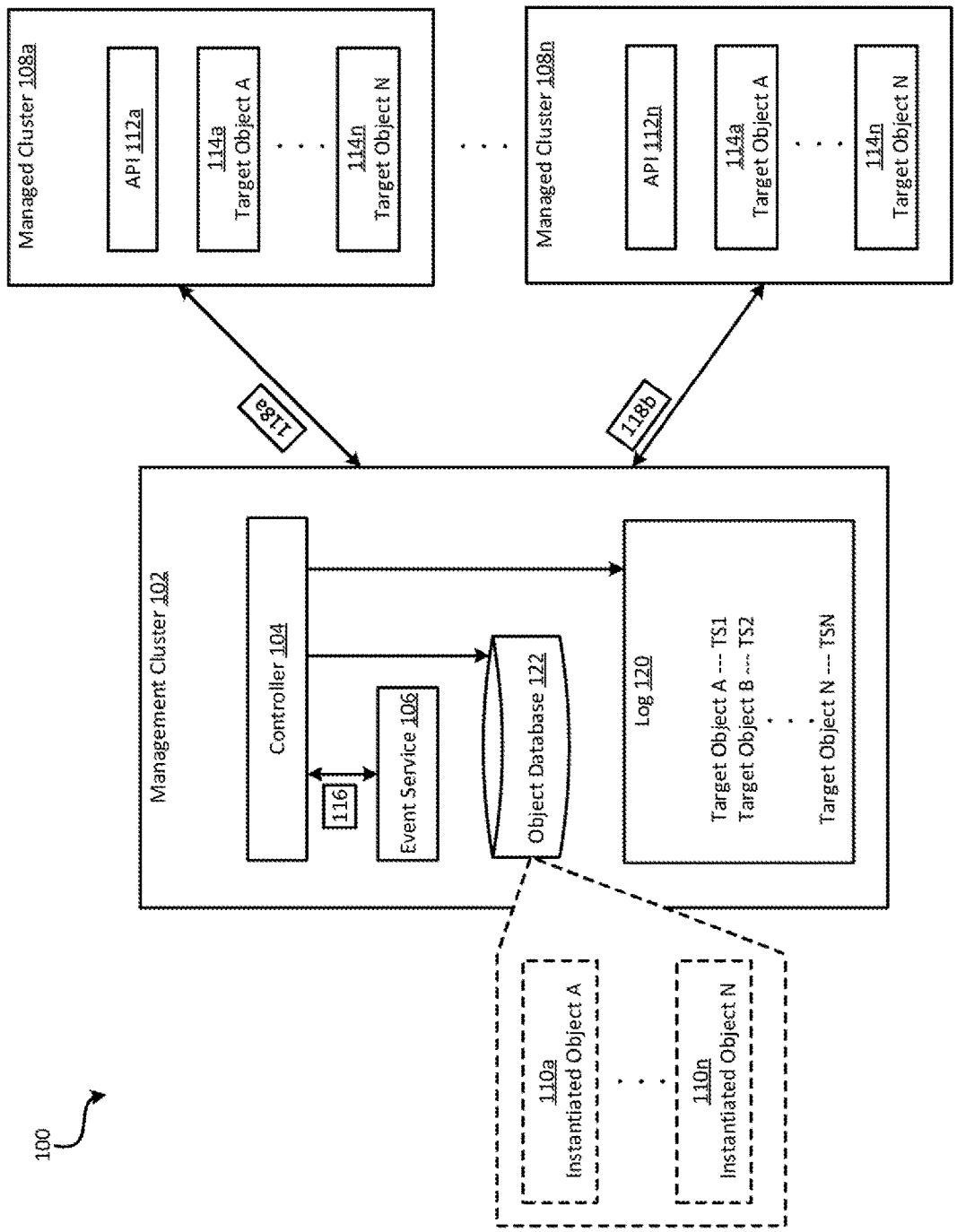
FIG. 1 is a block diagram of an example of a system for automatically configuring clusters according to some aspects of the present disclosure.

It has become increasingly common for service providers to have more than one computing cluster (cluster) for performing computing tasks. Having a group of clusters can provide a variety of advantages over having a single cluster. For example, a group of clusters can obtain higher availability and greater isolation among workloads and tenants than is possible with a single cluster. As another example, a group of clusters can reduce latency as compared to a single cluster, by enabling clients to interface with whichever cluster is located geographically closest to them. But each cluster in the group may need to be configured prior to use. And configuring a cluster is currently a time consuming, complex, manual, and error prone task, where configuration errors in the clusters can significantly affect the user experience.

Some examples of the present disclosure can overcome one or more of the abovementioned problems by automatically configuring managed clusters using configuration datasets stored within a management cluster. A management cluster is a computing cluster tasked with governing (e.g., dictating) features or operations of one or more other clusters. A managed cluster is a computing cluster that is subordinate to a management cluster and has features or operations that are at least partially dictated by the management cluster. In some examples, the management cluster can obtain the configuration datasets from a source inside the management cluster, where the configuration datasets are for configuring one or more target objects within the managed clusters. A target object is a persistent entity in a cluster, such as an instantiated object (e.g., a Kubernetes object in a Kubernetes-based cluster). After obtaining the configuration dataset, the management cluster can communicate with each individual managed cluster to automatically configure the target object(s) within the managed cluster based on the configuration datasets. Configuring a target object can involve creating, modifying, replacing, or deleting the target object. Using this approach, managed clusters can be more rapidly deployed with reduced errors.

In some examples, the configuration datasets can be stored within instantiated objects of the management cluster, such that the instantiated objects can serve as the source of the configuration datasets. An instantiated object is an object created in a computing environment through instantiation. Each instantiated object can include a respective configuration dataset for configuring a respective target object. Storing the configuration dataset in instantiated objects may allow the management cluster to leverage many of its existing features designed for use with instantiated objects. This can provide multiple advantages, some of which are detailed below.

For example, the management cluster can include an event service for automatically (e.g., with little or no human involvement) detecting events associated with instantiated objects. And by including the configuration datasets inside the instantiated objects, events associated with instantiated objects can serve as a proxy for events associated with the configuration datasets therein. Based on this relationship, the management cluster can automatically detect events associated with the configuration datasets and take action in response to those events. For example, the management cluster can detect a change to a configuration dataset inside an instantiated object, where the configuration dataset is for configuring a target object. In response to detecting the change, the management cluster can automatically reconfigure the target object on the managed clusters based on the changed configuration dataset. Reconfiguring a target object may involve transmitting one or more communications (e.g., API requests) to the managed clusters for causing each of the managed clusters to modify its respective version of the target object. As another example, the management cluster can detect a removal of an instantiated object from the management cluster, such as a deletion of the instantiated object from the object database. The instantiated object may have included a configuration dataset for a target object. In response to detecting the removal, the management cluster can automatically reconfigure the target object on the managed clusters, for example by undoing a configuration setting applied to the target object based on the configuration dataset.

Instantiated objects can also have corresponding statuses that can be monitored by the event service of the management cluster. The status of an instantiated object may indicate, for example, whether or not the corresponding configuration dataset has been successfully applied to the corresponding target object in some or all of the managed clusters. If the status of an instantiated object changes, the management cluster can detect such a status change event and automatically take action based on the status change event. For example, the management cluster can automatically detect a status change event in which a status of an instantiated object changed from an "in progress" state to a "failed" state. This may indicate that the configuration dataset corresponding to the instantiated object was unsuccessfully applied to the target object in one or more of the managed clusters. In response to detecting the status change event, the management cluster may automatically take corrective action. Examples of such corrective action can include attempting to reapply the configuration dataset to the target object in the one or more managed clusters again, notifying a user of the failure, or both of these.

In some examples, a comprehensive application programming interface (API) can be developed that leverages the existing capabilities of the management cluster to manipulate instantiated objects and thereby manipulate their corresponding configuration datasets. For example, an API can be developed that takes advantage of new and existing object functions in order to create, modify, delete, or monitor instantiated objects, and thereby perform similar functionality for their corresponding configuration datasets. Such an API may provide for greater and simpler control over the configuration datasets.

In some examples of the present disclosure, each configuration dataset can be specific to a single target object and unrelated to any other target object. For example, each instantiated object can include a configuration dataset for configuring an individual target object independently of the other target objects associated with the other instantiated objects. Because the configuration dataset for each target object is independent of the configuration datasets for the other target objects, some or all of the target objects can be configured in parallel to one another on a managed cluster. For example, the management cluster can communicate with a managed cluster for causing some or all of the target objects to be concurrently and independently configured in parallel to one another on the managed cluster. This can significantly reduce the amount of time taken to configure the managed cluster(s).

In some examples, the managed clusters cannot independently access (e.g., directly access) some or all of the configuration datasets stored on the management cluster. Instead, the management cluster may need to communicate the configuration datasets to each of the managed clusters. This can provide for improved customizability, because the management cluster can selectively provide a particular configuration dataset to some managed clusters and not to others. This can also provide for improved security, because the management cluster can selectively provide a particular configuration dataset that includes sensitive information only to authorized clusters. One example of the sensitive information can include authentication information, such as a username, password, pin number, code, encrypted ticket, digital signature, or another access credential. In this way, the management cluster can prevent unauthorized clusters from accessing the sensitive information in the configuration dataset.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for automatically configuring clusters according to some aspects of the present disclosure. The system 100 includes a management cluster 102 and a group of managed clusters 108a-n that are separate from the management cluster 102. The management cluster 102 can serve as a centralized location for governing one or more aspects of the managed clusters 108a-n. One way in which the management cluster 102 can govern the managed clusters 108a-n is by dictating the configurations of target objects 114a-n thereon, as described in greater detail below. But the management cluster 102 may also govern the managed clusters 108a-n by controlling other aspects of their operation. In some cases, the management cluster 102 may be dedicated to managing the managed clusters 108a-n (e.g., the management cluster 102 can primarily have the purpose or responsibility of managing the managed clusters 108a-n), while in other cases the management cluster 102 may perform a variety of tasks in addition to managing the managed clusters 108a-n.

The management cluster 102 can include a controller 104, which may be a software controller or a hardware controller. The controller 104 can perform one or more operations for automatically configuring the managed clusters 108a-n. For example, the controller 104 can access an object database 122 that includes one or more instantiated objects 110a-n. Each of the instantiated objects 110a-n can include a respective configuration dataset for configuring (e.g., creating, modifying, replacing, or deleting) a respective target object in the managed clusters 108a-n. For example, instantiated object 110a can include a respective configuration dataset for modifying at least one aspect of a target object 114a in some or all of the managed clusters 108a-n. As another example, the instantiated object 110n can include a respective configuration dataset for creating a target object 114n in some or all of the managed clusters 108a-n. Alternatively, the instantiated object 110n can include a respective configuration dataset for replacing the target object 114n in some or all of the managed clusters 108a-n with a new target object. The controller 104 can receive each configuration dataset from each of the instantiated objects 110a-n and configure a corresponding target object on the managed clusters 108a-n based on the configuration dataset. This can enable all of the managed clusters 108a-n to have similar configurations for their respective versions of the same target object.

The controller 104 can configure each target object on the managed clusters 108a-n by transmitting one or more communications 118a-b to each of the managed clusters 108a-n. Those communications can be generated based on a configuration dataset associated with the target object. For example, the controller 104 can determine one or more application programming interface (API) requests based on a configuration dataset for configuring the target object 114a. The controller 104 can then transmit the API requests to APIs 112a-n of the managed clusters 108a-n. The APIs 112a-n may be Kubernetes APIs in an example in which the managed clusters 108a-n are Kubernetes clusters. The managed clusters 108a-n can receive the API requests and each responsively configure their own versions of the target object 114a in accordance with the configuration dataset.

Each of the instantiated objects 110a-n can include one or more configuration datasets for configuring one or more target objects 114a-n. In some examples, the instantiated objects 110a-n can each include a single configuration dataset that is specific to a single target object and unrelated to any other target object. For example, instantiated object 110a can include a single configuration dataset that is specifically for configuring only target object 114a (e.g., that is for configuring the target object 114a independently of the other target objects 114b-n associated with the other instantiated objects 110b-n). By separating the different configuration datasets for different target objects in this way, some or all of the target objects can be configured in parallel on a managed cluster. For example, the management cluster 102 can communicate with a managed cluster 108a for causing the target objects 114a-n to be concurrently and independently configured in parallel to one another on the managed cluster 108a. This can significantly reduce the amount of time taken to configure the managed cluster 108a. The managed clusters 108a-n can also be configured in parallel to one another. For example, managed cluster 108a can configure its target objects in parallel to managed cluster 108n configuring its target objects. This can further reduce the amount of time taken to configure the managed clusters 108a-n.

In some examples, an instantiated object 110a can include a configuration dataset for generating another instantiated object 110n in the management cluster 102. In some such examples, the controller 104 can obtain the configuration dataset from the instantiated object 110a and generate the other instantiated object 110n in the management cluster 102 based on the configuration dataset. The other instantiated object 110n can, in turn, include a configuration dataset for configuration a target object 114n in the managed clusters 108a-n. These instantiated objects 110a, 110n can be referred to as "nested instantiated objects," since there is a nested relationship between them. Any number and combination of instantiated objects can be nested in this way. This type of nesting may allow for a single instantiated object 110a to spawn a subgroup of instantiated objects 110b-n, which may expedite the process of populating the object database 122.

The managed clusters 108a-n may be unable to access the instantiated objects 110a-n stored on the management cluster 102. Instead, the management cluster 102 may need to communicate the configuration datasets from the instantiated objects 110a-n to the managed clusters 108a-n. This can provide for improved customizability, because the management cluster 102 can selectively provide a particular configuration dataset to some managed clusters (e.g., those assigned certain labels or assigned to certain groups) and not to others. This can also provide for improved security, because the management cluster 102 can selectively provide a particular configuration dataset that includes sensitive information only to authorized clusters. For example, instantiated object 110a may include sensitive information that is only to be conveyed to a predefined subset of the managed clusters 108a-n authorized to access the sensitive information. Examples of this sensitive information may include personal information, such as a name, address, or social security number; authentication information, such as a username or password; financial information, such as a credit card number or bank account number; or any combination of these. The predefined subset can be identified using labels, where some of the managed clusters 108a-n can be labeled as authorized and/or others of the managed clusters 108a-n can be labeled as unauthorized. In such an example, the management cluster 102 can obtain the sensitive information from the instantiated object 110a and only convey it to the predefined subset of the managed clusters 108a-n labeled as authorized to access the sensitive information.

In some examples, the controller 104 can maintain a log 120 indicating the last time each of the target objects 114a-n was updated. For example, the log 120 can include a first timestamp ("TS1") indicating the last time a first target object 114a was updated, a second timestamp ("TS2") indicating the last time a second target object was updated, and an $n^{th}$ timestamp ("TSN") indicating the last time that the $n^{th}$ target object 114n was updated. The controller 104 can then access the log 120 and determine if a first predefined time interval has passed since the first timestamp. If so, the controller 104 can reconfigure the first target object 114a on the managed clusters 108a-n based on a configuration dataset in the instantiated object 110a and update the log 120 accordingly. Likewise, the controller 104 can access the log 120 and determine if a second predefined time interval has passed since the second timestamp. The second predefined time interval can be the same as or different from the first predefined time interval. If the controller 104 determines that the second predefined time interval has passed, the controller 104 can reconfigure the second target object on the managed clusters 108a-n based on a configuration dataset in a corresponding instantiated object and update the log 120 accordingly. And so on. The controller 104 can continuously repeat this process, so as to keep the configurations of each of the target objects 114a-n in sync with the configuration datasets. This can prevent configuration drift (e.g., configuration differences that can occur over time) between the configuration datasets and the target objects 114a-n.

In some examples, the management cluster 102 can include an event service 106 for detecting events in the management cluster 102. The events can be associated with instantiated objects, such as the instantiated objects 110a-n. For example, the events may include a "change event" in which an instantiated object's content has changed, a "status change" event in which an instantiated object's status has changed, a "creation event" in which an instantiated object has been created, and a "removal event" in which an instantiated object has been removed (e.g., from the object database 122 or elsewhere in the management cluster 102). The event service 106 can detect such an event and transmit one or more messages 116 indicative of the event. If the controller 104 has subscribed to the event service 106, the controller 104 can receive the message 116 from the event service 106, determine the event, and automatically perform one or more configuration operations based on the determined event.

One example can involve a change event corresponding to the instantiated object 110a. The controller 104 can detect the change event based on a message 116 from the event service 106. But some change events may require a reconfiguration of a corresponding target object 114a, while other change events may not. For example, a change to the configuration dataset of the instantiated object 110a may require a reconfiguration of the target object 114a on the managed clusters 108a-n, whereas a change to metadata of the instantiated object 110a may not. So, the controller 104 may delineate between these two situations, for example by using a hash-comparison process detailed below. This may avoid performing unnecessary configuration operations, such as unnecessarily transmitting API requests 118a-n to the managed clusters 108a-n.

The abovementioned hash-comparison process may involve the controller 104 obtaining a first hashed value associated with a prior version of the configuration dataset. The first hashed value may be, for example, a checksum derived from the prior version of the configuration dataset.

The controller 104 may have generated the first hashed value prior to receiving the message 116 and stored it in connection with the instantiated object 110a. Additionally, the controller 104 can generate a second hashed value associated with a current version of the configuration dataset. The second hashed value may also be, for example, a checksum derived from the current version of the configuration dataset. The current version of the configuration dataset is obtained from the instantiated object 110a after receiving the message 116. The controller 104 can then determine if there is a difference between the first hashed value and the second hashed value. If there is no difference, then the configuration dataset has not been modified and the controller 104 can forego performing the configuration operations, thereby conserving computing resources. If the controller 104 determines there is a difference between the two, then the configuration dataset has been modified and the controller 104 can perform the configuration operations. For example, the controller 104 can automatically reconfigure the target object 114a in each of the managed clusters 108a-n based on the modification.

Another example can involve a status change event associated with an instantiated object 110a. The controller 104 can detect the status change event based on a message 116 from the event service 106. In response to detecting the status change event, the controller 104 can determine that the status of the instantiated object 110a changed from a first state to a second state. Examples of such states can include a "completed" state associated with a successful application of a configuration dataset to a target object 114a, an "in progress" state associated with applying the configuration dataset to the target object 114a, and a "failure" state associated with an unsuccessful application of the configuration dataset to the target object 114a. Based on determining that the state of the instantiated object 110a changed from the first state to the second state, the controller 104 may automatically perform one or more configuration operations. For example, if the second state is a failure state, the controller 104 may attempt to reapply the configuration dataset to the target object 114a in one or more of the managed clusters 108a-n. This may involve transmitting communications to the one or more managed clusters 108a-n to cause each of the one or more managed clusters 108a-n to reapply the configuration data to its respective target object 114a. The controller 104 may additionally or alternatively notify a user of the failure.

Yet another example can involve a removal event associated with an instantiated object 110a, which may have had a configuration dataset for configuring a target object 114a in the managed clusters 108a-n. The controller 104 can detect the removal event based on a message 116 from the event service 106. In response to detecting the removal event, the controller 104 can automatically reconfigure the target object 114a in the managed clusters 108a-n based on the removal of the instantiated object 110a. For example, the controller 104 can automatically reconfigure the target object 114a in the managed clusters 108a-n so as to undo a configuration setting applied to the target object 114a as a result of the configuration dataset. This may involve transmitting communications to the managed clusters 108a-n for causing each of the managed clusters 108a-n to undo the configuration setting from its respective target object 114a.

It will be appreciated that the above examples are illustrative and intended to be non-limiting. Numerous modifications are possible and contemplated within the scope of this disclosure. For example, the instantiated objects 110a-n can be located elsewhere in the management cluster 102 than inside an object database 122. As another example, the configuration datasets can be stored in other types of entities other than instantiated objects 110a-n, such as files or database entries. As still another example, the controller 104 may detect the events (e.g., change events, status change events, removal events, etc.) using means other than the event service 106. And while FIG. 1 depicts an example involving computing clusters, it will be appreciated that similar principles can be applied to any number and combination of types of distributed computing systems (DCS), such as grid computing systems and cloud computing systems. In some such examples, there can be a management DCS and managed DCSs having similar functionality to the management cluster 102 and the managed clusters 108a-n, respectively.

FIG. 2 is an example of a configuration dataset 200 according to some aspects of the present disclosure. The configuration dataset 200 can include general information 202 about the configuration dataset 200. The general information 202 can specify an API version associated with the configuration dataset 200, which in this example is "hive.o-pensift.io/v1." The general information 202 can also specify a kind of the configuration dataset 200, which in this example is a "SyncSet." The general information 202 can further specify metadata for the configuration dataset 200, like a name for the configuration dataset 200. Additionally, the general information 202 can specify one or more target (e.g., managed) clusters to which the configuration dataset 200 is to be applied under the "clusterDeploymentRefs" heading. In this example, the target cluster is a cluster with the name "ClusterName." But in other examples, the configuration dataset 200 can include a group label (e.g., a group name) referring to a group of target clusters, whereby the configuration dataset 200 is to be applied to all of the target clusters in that group.

The configuration dataset 200 can also include an application mode indicator 204, which specifies an application mode for the configuration dataset 200. There may be many different possible application modes. One example of an application mode is an "upsert" mode, in which target objects can be created and updated, but never deleted, to match the configuration dataset 200. Another example of an application mode is a "sync" mode, in which target objects can be created, updated, or deleted based on the configuration dataset 200. Other examples can involve more, fewer, or different types of application modes.

The configuration dataset 200 can further include an object definition 206 defining parameters for a target object to be created on the target cluster. In this example, the object definition 206 indicates that the kind of target object to be created is a group object, as specified by the "kind" parameter. But various other kinds of target objects are possible. The object definition 206 also indicates that group object is to have the name "mygroup" as specified by the metadata name parameter, and a user "myuser" as specified by the users parameter.

The configuration dataset 200 may also include a modification definition 208 defining a modification to make to a pre-existing target object on the target cluster. Such modifications can be referred to as "patches." This target object may be different from the target object specified in the object definition 206. In this example, the modification definition 208 can specify an existing target object named "foo" of kind "ConfigMap" on the target cluster. In addition to specifying a kind and a name of the target object, the modification definition 208 also indicates a namespace corresponding to the target object, which in this example is "default." The modification definition 208 further specifies the modification in the "patch" parameter. In the example shown in FIG. 2, the patch involves adjusting the "data" field for the target object to contain the key-value pair "foo=new-bar," where "foo" is the key and the adjusted value is to be "new-bar." But other modifications may also be possible, depending on the configurable parameters available for the target object.

The modification definition 208 further indicates a modification mode, which is referred to as a "patchMode" in FIG. 2. There can be many kinds of modification modes available, such as an "always apply" mode and an "apply once" mode. The "always apply" mode can involve applying the modification to the target object on the managed clusters every X minutes or hours (e.g., every 2 hours), which may prevent configuration drift. The "apply once" mode can involve applying the modification to the target object on the managed clusters a single time, rather than applying it repeatedly (like in the "always apply" mode).

The configuration dataset 200 can additionally include a sensitive information definition 210 specifying sensitive information to be used in configuring a target object on the target cluster. This target object may be different from the target objects specified in the object definition 206 and the modification definition 208. In some examples, the sensitive information definition 210 can specify a source (e.g., a source object) of the sensitive information on the management cluster 102 and a target (e.g., a target object) for the sensitive information on the target cluster, without actually including the sensitive information (e.g., as plain-text) in the configuration dataset 200. This can enable the configuration dataset 200 to be viewed by non-privileged users without exposing the sensitive information. The sensitive information can then be copied from the source to the target. The particular example shown in FIG. 2 involves copying sensitive information from a source object named "ad-bind-password" in the "default" namespace of the management cluster 102 to a target object named "ad-bind-password" in a target namespace of "openshift-config" on the target cluster, so that the sensitive information is available in to the target object in the target namespace on the target cluster.

In some examples, the management cluster 102 can obtain the configuration dataset 200, for example from an instantiated object. The management cluster 102 can then apply the configuration dataset 200 to configure one or more of the specified target objects in one or more of the specified managed clusters. In some examples, the management cluster 102 may apply the configuration dataset 200 in the order in which it is written, which can enable a developer to have better control over how the configuration dataset 200 is applied. For example, the management cluster 102 can first create a target object specified in the object definition 206. The management cluster 102 can next apply the modification specified in the modification definition 208 to another target object. Finally, the management cluster 102 can make the sensitive information specified in the sensitive information definition 210 available to yet another target object. In other examples, the management cluster 102 may apply the configuration dataset 200 out of order, which may improve speed in some circumstances.

It will be appreciated that the configuration dataset 200 shown in FIG. 2 is exemplary and intended to be non-limiting. Other examples can include more, less, or different data than is shown in FIG. 2. A configuration dataset 200 can include any number and combination of object definitions, any number and combination of modification definitions, and any number and combination of sensitive information definitions. And object definitions, modification definitions, and sensitive information definitions can each include more, less, or different data than is shown in FIG. 2.

Figure 3:
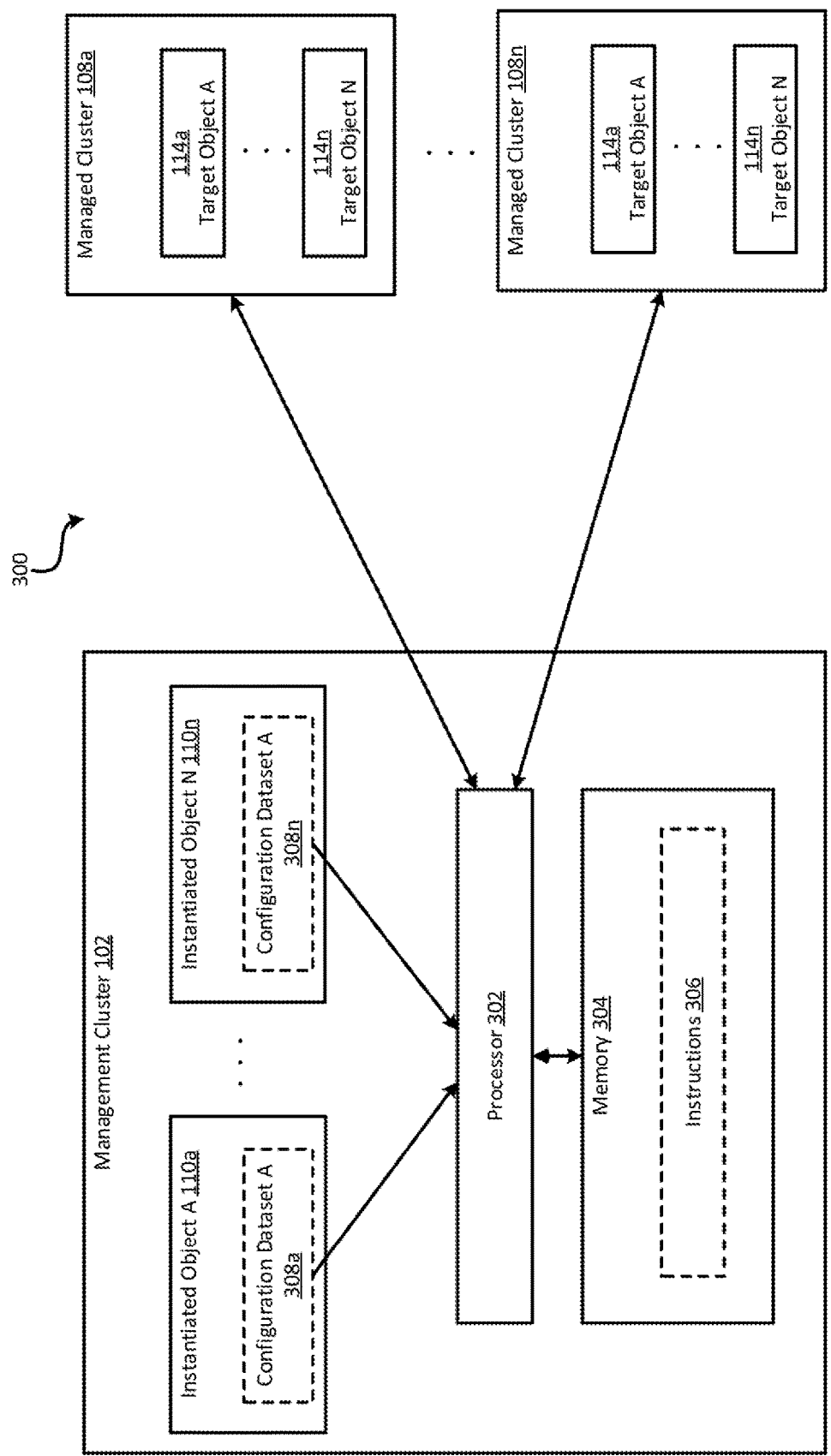
FIG. 3 is a block diagram of another example of a system for automatically configuring clusters according to some aspects of the present disclosure.

FIG. 3 is a block diagram of another example of a system 300 for automatically configuring clusters according to some aspects of the present disclosure. The system 300 includes a processor 302 communicatively coupled to a memory 304. The processor 302 and memory 304 may be integrated into a single housing or may be distributed from one another. In some examples, the processor 302 and memory 304 may be parts of the controller 104 of FIG. 1.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform one or more operations. In some examples, the instructions 306 can include processor-specific instructions generated by a compiler or an interpreter from code written in any suitable computer-programming language, such as C, C++, C#, etc.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least a portion of the memory device includes a non-transitory computer-readable medium. A non-transitory computer-readable medium can include electronic, optical, magnetic, or other storage devices capable of providing the processor 302 with the instructions 306 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 306.

In some examples, the processor 302 can perform some or all of the functionality described herein by executing the instructions 306. For example, the processor 302 can receive a plurality of configuration datasets 308a-n from a plurality of instantiated objects 110a-n in a management cluster 102. The plurality of configuration datasets 308a-n can be for configuring a plurality of target objects 114a-n in a plurality of managed clusters 108a-n separate from and managed by the management cluster 102. The processor 302 can then configure the plurality of target objects 114a-n within each managed cluster among the plurality of managed clusters 108a-n based on the plurality of configuration datasets 308a-n. This can enable the plurality of managed clusters 108a-n to have similar configurations for their respective versions of the plurality of target objects 114a-n.

It will be appreciated that although the processor 302 and the memory 304 are depicted in FIG. 3 as being included in the management cluster 102, other examples can involve the processor 302 or memory 304 being located elsewhere. For example, the processor 302 and the memory 304 can be located in a computing device that is separate from and in communication with the management cluster 102 and the managed clusters 108a-n. In another example that lacks a management cluster 102, the processor 302 and the memory 304 can be located in a computing device that is separate from and in communication with the managed clusters 108a-n, whereby the computing device can implement some or all of the functionality described herein with respect to the management cluster 102.

Figure 4:
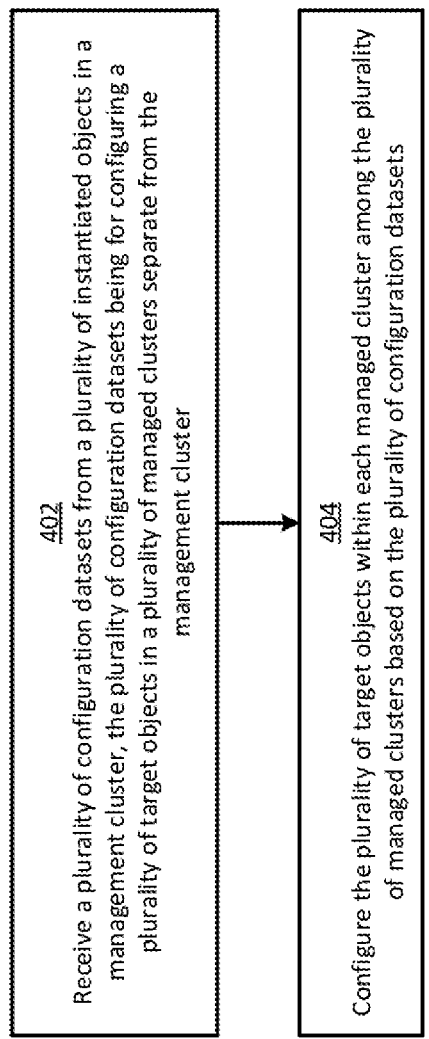
FIG. 4 a flow chart of an example of a process for automatically configuring clusters according to some aspects of the present disclosure.

FIG. 4 a flow chart of an example of a process for automatically configuring clusters according to some aspects of the present disclosure. While FIG. 4 depicts a certain sequence of steps for illustrative purposes, other examples can involve more steps, fewer steps, different steps, or a different order of the steps than is depicted in FIG. 4. The steps of FIG. 4 are described below with reference to components of FIG. 3.

In block 402, a processor receives a plurality of configuration datasets 308a-n from a plurality of instantiated objects 110a-n in a management cluster 102. The plurality of configuration datasets 308a-n can be for configuring a plurality of target objects 114a-n in a plurality of managed clusters 108a-n that are separate from the management cluster 102. Each of the target objects 114a-n may have one or more configurable parameters that can be set based on the configuration datasets 308a-n.

The target objects 114a-n can include one or more types of objects. Examples of object types can include instantiated objects, files, or applications. In one particular example, the target objects 114a-n can include one or more of the following instantiated objects: (i) an identity provider object for managing an identity provider for a managed cluster, (ii) an ingress object for managing how applications are exposed to client devices outside the managed cluster, (iii) a webUI object for managing characteristics of a web interface, or (iv) a certificate object for managing certificates (e.g., HTTP certificates).

In block 404, the processor 302 configures the plurality of target objects 114a-n within each managed cluster among the plurality of managed clusters 108a-n based on the plurality of configuration datasets 308a-n. For example, the processor 302 can configure the plurality of target objects 114a-n within managed cluster 108a by transmitting one or more communications (e.g., requests or commands) to managed cluster 108a. The one or more communications can cause the managed cluster 108a to configure the plurality of target objects 114a-n on itself in accordance with the plurality of configuration datasets 308a-n. The processor 302 can also configure the plurality of target objects 114a-n within managed cluster 108n by transmitting one or more communications to managed cluster 108n. The one or more communications can cause the managed cluster 108n to configure the plurality of target objects 114a-n on itself in accordance with the plurality of configuration datasets 308a-n. In some examples, the plurality of target objects 114a-n can be configured on the managed cluster 108a in parallel to the plurality of target objects 114a-n being configured on the managed cluster 108n.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A management cluster, comprising:
a plurality of nodes;
a plurality of instantiated objects including a plurality of configuration datasets;
a processor communicatively coupleable to a plurality of managed clusters that are separate from the management cluster; and
a memory comprising instructions that are executable by the processor for causing the processor to:
receive the plurality of configuration datasets from the plurality of instantiated objects in the management cluster, the plurality of configuration datasets being for configuring a plurality of target objects in the plurality of managed clusters, the plurality of target objects being separate from the plurality of instantiated objects; and
configure the plurality of target objects within each managed cluster among the plurality of managed clusters based on the plurality of configuration datasets.

2. The management cluster of claim 1, wherein each instantiated object among the plurality of instantiated objects includes a respective configuration dataset for configuring a respective target object among the plurality of target objects within one or more managed clusters.

3. The management cluster of claim 1, wherein the memory further comprises instructions that are executable by the processor for causing the processor to:
concurrently configure the plurality of target objects within a managed cluster among the plurality of managed clusters by applying the plurality of configuration datasets in parallel to the plurality of target objects within the managed cluster.

4. The management cluster of claim 1, further comprising an event service, wherein the memory further comprises instructions that are executable by the processor for causing the processor to:
receive a message from the event service in the management cluster;
detect an event based on the message, the event being associated with an instantiated object among the plurality of instantiated objects, the instantiated object including a configuration dataset for configuring a target object among the plurality of target objects; and
based on detecting the event, reconfigure the target object in the plurality of managed clusters.

5. The management cluster of claim 4, wherein the event is a change event triggered by a modification of the configuration dataset in the instantiated object, and wherein the memory further comprises instructions that are executable by the processor for causing the processor to reconfigure the target object in the plurality of managed clusters based on the modification to the configuration dataset.

6. The management cluster of claim 5, wherein the memory further comprises instructions that are executable by the processor for causing the processor to, in response to detecting the change event:
determine a first hashed value associated with a first version of the configuration dataset;
determine a second hashed value associated with a second version of the configuration dataset;
determine that the first hashed value is different than the second hashed value; and
based on determining that the first hashed value is different than the second hashed value, reconfigure the target object in the plurality of managed clusters.

7. The management cluster of claim 4, wherein the event is a removal event triggered by a removal of the instantiated object from the management cluster, and wherein the memory further comprises instructions that are executable by the processor for causing the processor to reconfigure the target object in the plurality of managed clusters to remove a configuration setting previously applied to the target object as a result of the configuration dataset associated with the instantiated object.

8. The management cluster of claim 1, wherein the memory further comprises instructions that are executable by the processor for causing the processor to:
 determine that a predefined time interval has passed, the predefined time interval being associated with a target object among the plurality of target objects; and
 in response to determining that the predefined time interval has passed, reconfigure the target object within the plurality of managed clusters based on a corresponding configuration dataset among the plurality of configuration datasets.

9. The management cluster of claim 1, wherein the memory further comprises instructions that are executable by the processor for causing the processor to configure the plurality of target objects within a managed cluster among the plurality of managed clusters by:
 determining a plurality of application programming interface (API) requests based on the plurality of configuration datasets; and
 transmitting the plurality of API requests to an API of the managed cluster, the managed cluster being operable to configure the plurality of target objects in response to receiving the API requests.

10. The management cluster of claim 1, wherein the memory further comprises instructions that are executable by the processor for causing the processor to:
 receive a first configuration dataset from a first instantiated object of the plurality of instantiated objects; and
 generate a second instantiated object within the management cluster based on the first configuration dataset, the second instantiated object including a second configuration dataset for configuring a target object in the plurality of managed clusters.

11. The management cluster of claim 1, wherein an instantiated object among the plurality of instantiated objects includes sensitive information for configuring a target object among the plurality of target objects, and wherein the memory further comprises instructions that are executable by the processor for causing the processor to:
 determine a subset of managed clusters authorized to access the sensitive information from among the plurality of managed clusters; and
 transmit the sensitive information only to the subset of managed clusters for causing the subset of managed clusters to configure the target object using the sensitive information.

12. The management cluster of claim 1, wherein a single instantiated object of the plurality of instantiated objects includes a configuration dataset specifying how to configure two or more different types of target objects among the plurality of target objects.

13. The management cluster of claim 1, wherein the plurality of target objects includes at least two different types of target objects.

14. A method comprising:
 receiving, by a processor of a management cluster, a plurality of configuration datasets from a plurality of instantiated objects in the management cluster, the plurality of configuration datasets being for configuring a plurality of target objects in a plurality of managed clusters separate from the management cluster, the plurality of target objects being separate from the plurality of instantiated objects; and
 configuring, by the processor, the plurality of target objects within each managed cluster among the plurality of managed clusters based on the plurality of configuration datasets.

15. The method of claim 14, further comprising:
 detecting, by the management cluster, an event associated with an instantiated object among the plurality of instantiated objects, the instantiated object including a configuration dataset for configuring a target object among the plurality of target objects; and
 based on detecting the event, reconfiguring, by the management cluster, the target object in the plurality of managed clusters.

16. The method of claim 15, wherein the event is a change event triggered by a modification of the configuration dataset of the instantiated object, and wherein the target object is reconfigured in the plurality of managed clusters based on the modification to the configuration dataset.

17. The method of claim 15, wherein the event is a removal event triggered by a removal of the instantiated object from the management cluster, and wherein the target object is reconfigured in the plurality of managed clusters to remove a configuration setting previously applied to the target object as a result of the configuration dataset associated with the instantiated object.

18. The method of claim 14, further comprising:
 determining, by the management cluster, that a predefined time interval has passed since a target object among the plurality of target objects was last configured in the plurality of managed clusters; and
 in response to determining that the predefined time interval has passed, reconfiguring the target object within the plurality of managed clusters based on a corresponding configuration dataset among the plurality of configuration datasets.

19. The method of claim 14, wherein an instantiated object among the plurality of instantiated objects includes sensitive information for configuring a target object among the plurality of target objects, and further comprising:
 determining, by the management cluster, a subset of managed clusters authorized to access the sensitive information from among the plurality of managed clusters; and
 transmitting, by the management cluster, the sensitive information only to the subset of managed clusters for causing the subset of managed clusters to configure the target object using the sensitive information.

20. A non-transitory computer-readable medium comprising program code that is executable by a processor for causing the processor to:
 receive a plurality of configuration datasets from a plurality of instantiated objects in a management cluster, the plurality of configuration datasets being for configuring a plurality of target objects in a plurality of managed clusters separate from the management cluster, the plurality of target objects being separate from the plurality of instantiated objects; and
 configure the plurality of target objects within each managed cluster among the plurality of managed clusters based on the plurality of configuration datasets.

* * * * *